US011531457B2

(12) United States Patent
Trepess

(10) Patent No.: US 11,531,457 B2
(45) Date of Patent: *Dec. 20, 2022

(54) VIDEO DISPLAY FOR DISPLAYING A SERIES OF REPRESENTATIVE IMAGES FOR VIDEO

(71) Applicant: SONY EUROPE B.V., Weybridge (GB)

(72) Inventor: David William Trepess, Weybridge (GB)

(73) Assignee: SONY EUROPE B.V., Weybridge (GB)

( * ) Notice: Subject to any disclaimer, the term of this patent is extended or adjusted under 35 U.S.C. 154(b) by 536 days.

This patent is subject to a terminal disclaimer.

(21) Appl. No.: 15/359,265

(22) Filed: Nov. 22, 2016

(65) Prior Publication Data

US 2017/0075550 A1   Mar. 16, 2017

Related U.S. Application Data

(63) Continuation of application No. 11/296,307, filed on Dec. 8, 2005, now Pat. No. 9,535,991.

(30) Foreign Application Priority Data

Dec. 9, 2004 (GB) ..................................... 0427032

(51) Int. Cl.
*G06F 3/04845* (2022.01)
*G11B 27/10* (2006.01)
(Continued)

(52) U.S. Cl.
CPC ........ *G06F 3/04845* (2013.01); *G06F 3/0481* (2013.01); *G06F 3/0482* (2013.01);
(Continued)

(58) Field of Classification Search
CPC ..... G11B 27/031; G11B 27/036; G11B 27/06; G11B 27/102; G11B 27/3081;
(Continued)

(56) References Cited

U.S. PATENT DOCUMENTS 5,227,771 A    7/1993 Kerr et al.
5,237,648 A    8/1993 Mills et al.
(Continued)

FOREIGN PATENT DOCUMENTS

WO    WO 00/65429    11/2000

OTHER PUBLICATIONS

A. Girgensohn and J. Boreczky, Time-Constrained Keyframe Selection Technique, in IEEE Multimedia Systems 1996, IEEE Computer Society, vol. 1, pp. 756-761, 1999.*

(Continued)

*Primary Examiner* — Jennifer N Welch
*Assistant Examiner* — KC Chen
(74) *Attorney, Agent, or Firm* — Oblon, McClelland, Maier & Neustadt, L.L.P.

(57) ABSTRACT

A video display apparatus for displaying a catalogue of one or more candidate video items for replay, each video item being represented in the catalogue by a catalogue entry having at least one displayed representative image comprises a user control device operable to resize a displayed catalogue entry by a select-and-drag operation; and means responsive to a resizing of a catalogue entry to select a number of distinct representative images, for display in respect of that video item, so that the number displayed increases with increasing size of the catalogue entry while the display size of each representative image stays substantially constant with respect to changes in the catalogue entry size.

21 Claims, 4 Drawing Sheets

(51) Int. Cl.
*G06F 3/04817* (2022.01)
*G06F 3/0481* (2022.01)
*G06F 16/738* (2019.01)
*G06F 16/74* (2019.01)
*H04N 21/4143* (2011.01)
*H04N 21/431* (2011.01)
*H04N 21/443* (2011.01)
*H04N 21/472* (2011.01)
*H04N 21/845* (2011.01)
*H04N 21/47* (2011.01)
*G06F 3/0482* (2013.01)
*G06F 3/04847* (2022.01)
*G11B 27/30* (2006.01)
*G11B 27/34* (2006.01)

(52) U.S. Cl.
CPC ...... *G06F 3/04817* (2013.01); *G06F 3/04847* (2013.01); *G06F 16/739* (2019.01); *G06F 16/743* (2019.01); *G11B 27/102* (2013.01); *G11B 27/3081* (2013.01); *G11B 27/34* (2013.01); *H04N 21/4143* (2013.01); *H04N 21/4312* (2013.01); *H04N 21/4438* (2013.01); *H04N 21/47* (2013.01); *H04N 21/47217* (2013.01); *H04N 21/8455* (2013.01)

(58) Field of Classification Search
CPC ..... G11B 27/34; G06F 3/0481; G06F 3/0482; G06F 3/4817; G06F 3/04845; G06F 3/04817; G06F 3/04847; G06F 16/739; G06F 16/743; G09G 2340/0464; H04N 21/4143; H04N 21/4312; H04N 21/4438; H04N 21/47; H04N 21/47217; H04N 21/8455

See application file for complete search history.

(56) References Cited

U.S. PATENT DOCUMENTS

| | | | |
|---|---|---|---|
| 5,513,306 A | 4/1996 | Mills et al. | |
| 5,586,244 A | 12/1996 | Berry | |
| 5,621,876 A * | 4/1997 | Odam | G06F 17/246 |
| | | | 345/660 |
| 5,758,110 A | 5/1998 | Boss et al. | |
| 5,870,090 A * | 2/1999 | Takai | G06F 3/04842 |
| | | | 715/788 |
| 5,956,026 A | 9/1999 | Ratakonda | |
| 5,995,095 A | 11/1999 | Ratakonda | |
| 5,999,173 A * | 12/1999 | Ubillos | G11B 27/034 |
| | | | 348/E5.056 |
| 6,144,375 A | 11/2000 | Jain et al. | |
| 6,236,395 B1 | 5/2001 | Sezan et al. | |
| 6,292,188 B1 | 9/2001 | Carlson et al. | |
| 6,526,215 B2 | 2/2003 | Hirai et al. | |
| 6,570,590 B1 | 5/2003 | Dubrow et al. | |
| 6,642,936 B1 | 11/2003 | Engholm et al. | |
| 6,807,306 B1 | 10/2004 | Girgensohn et al. | |
| 6,925,602 B1 | 8/2005 | Clapper | |
| 6,931,595 B2 | 8/2005 | Pan et al. | |
| 6,968,511 B1 | 11/2005 | Robertson et al. | |
| 6,983,424 B1 | 1/2006 | Dutta | |
| 7,035,435 B2 | 4/2006 | Li et al. | |
| 7,120,873 B2 | 10/2006 | Li | |
| 7,143,354 B2 | 11/2006 | Li et al. | |
| 7,191,411 B2 | 3/2007 | Moehrle | |
| 7,383,508 B2 * | 6/2008 | Toyama | G06F 3/0481 |
| | | | 715/723 |
| 7,426,537 B2 | 9/2008 | Lee et al. | |
| 7,458,030 B2 | 11/2008 | Kirn et al. | |
| 8,006,192 B1 | 8/2011 | Reid | |
| 8,448,083 B1 | 5/2013 | Migos et al. | |
| 2001/0007455 A1 | 7/2001 | Yoo et al. | |
| 2003/0154250 A1 | 8/2003 | Miyashita | |
| 2003/0174872 A1 | 9/2003 | Chalana et al. | |
| 2004/0111131 A1 | 6/2004 | Hu | |
| 2004/0125124 A1 | 7/2004 | Kim et al. | |
| 2004/0136698 A1 | 7/2004 | Mock | |
| 2004/0233239 A1 | 11/2004 | Landesmaki | |
| 2005/0028199 A1 | 2/2005 | Borden, IV | |
| 2005/0034083 A1 | 2/2005 | Jaeger | |
| 2005/0036708 A1 * | 2/2005 | Boll | H04N 1/00352 |
| | | | 382/283 |
| 2005/0091596 A1 | 4/2005 | Anthony et al. | |
| 2005/0100308 A1 * | 5/2005 | Moteki | G11B 27/34 |
| | | | 386/241 |
| 2005/0213656 A1 | 9/2005 | Liu et al. | |
| 2006/0026521 A1 | 2/2006 | Hotelling et al. | |
| 2006/0036964 A1 | 2/2006 | Satterfield et al. | |
| 2006/0123359 A1 | 6/2006 | Schatzberger | |
| 2006/0156237 A1 | 7/2006 | Williams et al. | |
| 2007/0168413 A1 | 7/2007 | Barletta et al. | |

OTHER PUBLICATIONS

Maël Guillemot, et al., "A Hierarchical Keyframe User Interface for Browsing Video Over the Internet", IDIAP Communication 03-02, Aug. 7, 2003, 8 Pages.

Andreas Girgensohn, et al., "Keyframe-Based User Interfaces for Digital Video", Computer, IEEE Service Center, vol. 34, No. 9, XP-001102084, Sep. 2001, pp. 61-67.

* cited by examiner

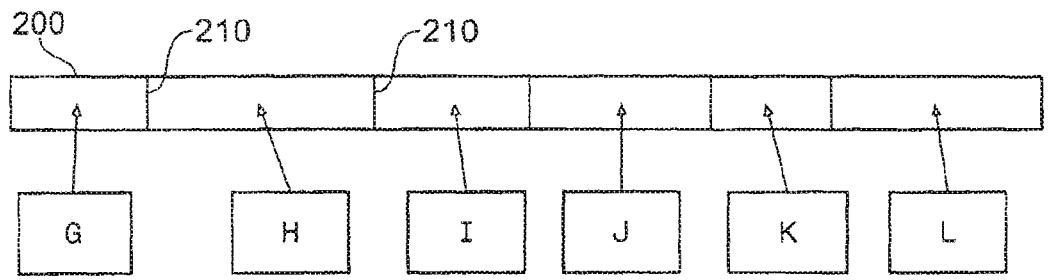
Fig. 4
Fig. 3A
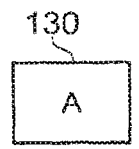
Fig. 3B
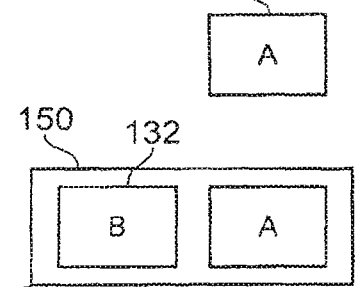
Fig. 3C
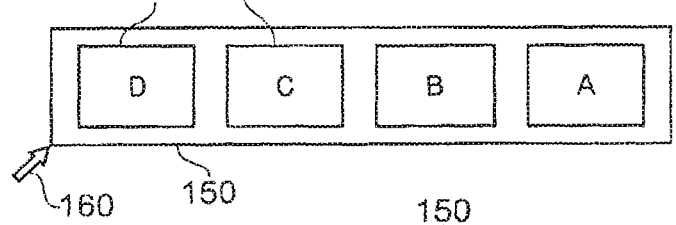
Fig. 3D
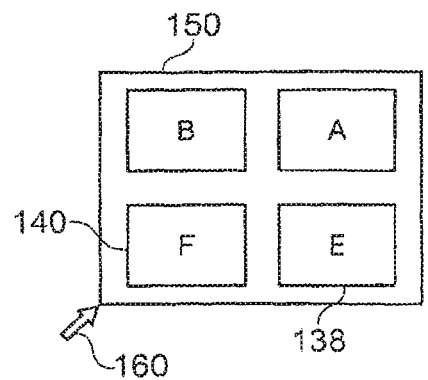

VIDEO DISPLAY FOR DISPLAYING A SERIES OF REPRESENTATIVE IMAGES FOR VIDEO

CROSS REFERENCE TO RELATED APPLICATIONS

This application is a continuation of U.S. application Ser. No. 11/296,307, filed Dec. 8, 2005, now U.S. Pat. No. 9,535,991 (the entire contents of which are incorporated herein by reference), and is based upon and claims the benefit of priority from the prior GB Patent Application No. 0427032.8, filed Dec. 9, 2004.

BACKGROUND OF THE INVENTION

Field of the Invention

This invention relates to video display.

Description of the Prior Art

In a video display system, for example, a computer-based video display system, it is often difficult for a user to know what video material is available for viewing without wasting a lot of time manually searching through the material.

It has been proposed to use so-called representative images (often called "thumbnails" or "keyframes") to indicate the content of a piece of video material. A representative image is often taken from a fixed point within a piece of material, for example, the first frame. In a long piece of material, such a single image may not provide a good indication of the overall content of the material. In particular, the first image of a sequence may be invalid—for example, a blank image or a test pattern.

To address this problem, it has been proposed that multiple representative images could be used. The paper "A hierarchical keyframe user interface for browsing video over the internet", M. Guillemot et al. IDIAP-COM 03-02, August 2003 discloses an arrangement whereby the user may select one or two levels of increased detail, each providing a greater number of representative images.

SUMMARY OF THE INVENTION

This invention provides a video display apparatus for displaying a catalogue of one or more candidate video items for replay, each video item being represented in the catalogue by a catalogue entry having at least one displayed representative image; the apparatus comprising:

a user control device operable to resize a displayed catalogue entry by a select-and-drag operation; and means responsive to a resizing of a catalogue entry to select a number of distinct representative images, for display in respect of that video item, so that the number displayed increases with increasing size of the catalogue entry while the display size of each representative image stays substantially constant with respect to changes in the catalogue entry size.

In embodiments of the present invention, with just one, quick, interaction a user can interrogate the content of a video item to a degree where they are satisfied that they have seen enough to make a decision to view the video item.

As the user expands the catalogue entry, the system intelligently fills the space with more representative images for that video item. The more the user expands the catalogue entry the more information they see. This expandability allows the user to see as much as they need to make a decision as to whether the media is what they are looking for or not. When they have seen enough they simply end the select-and-drag operation (e.g. lift their finger off the mouse) and move on to the next operation.

The invention allows the user to interrogate the catalogue quickly without having to open a further screen or panel within the interface (e.g. "More Info", "Details", "storyboard", etc.).

The Guillemot et al paper presents a catalogue list to the user. Next to each representative image is a "+" button. The user has to click the "+" button to see a storyboard of the item that the representative image represents. Next to each further image is a further "+" button which the user clicks to present a shot breakdown below the further image. It should be noted that:

(a) this requires 3 interactions to interrogate a single item and it is a potentially slow process.

(b) the "+" button is similar to a "more info" or "storyboard" button and does not appear to add any benefits over and above a conventional story board.

(c) the number of representative images that the system displays to the user is fixed so the user does not have a choice as to when they have seen enough.

The present invention addresses these drawbacks with an advantageously elegant, flexible and convenient user interface arrangement allowing the user to vary the amount of information he sees with a simple select-and-drag operation.

Further respective aspects of the invention are defined in the appended claims.

BRIEF DESCRIPTION OF THE DRAWINGS

The above and other features and advantages of the invention will be apparent from the following detailed description of illustrative embodiments which is to be read in connection with the accompanying drawings in which:

FIGS. 3A to 3D schematically illustrate resizable catalogue entry;

FIG. 4 schematically illustrates a set of representative keyframes; and

DESCRIPTION OF THE PREFERRED EMBODIMENTS

Figure 1:
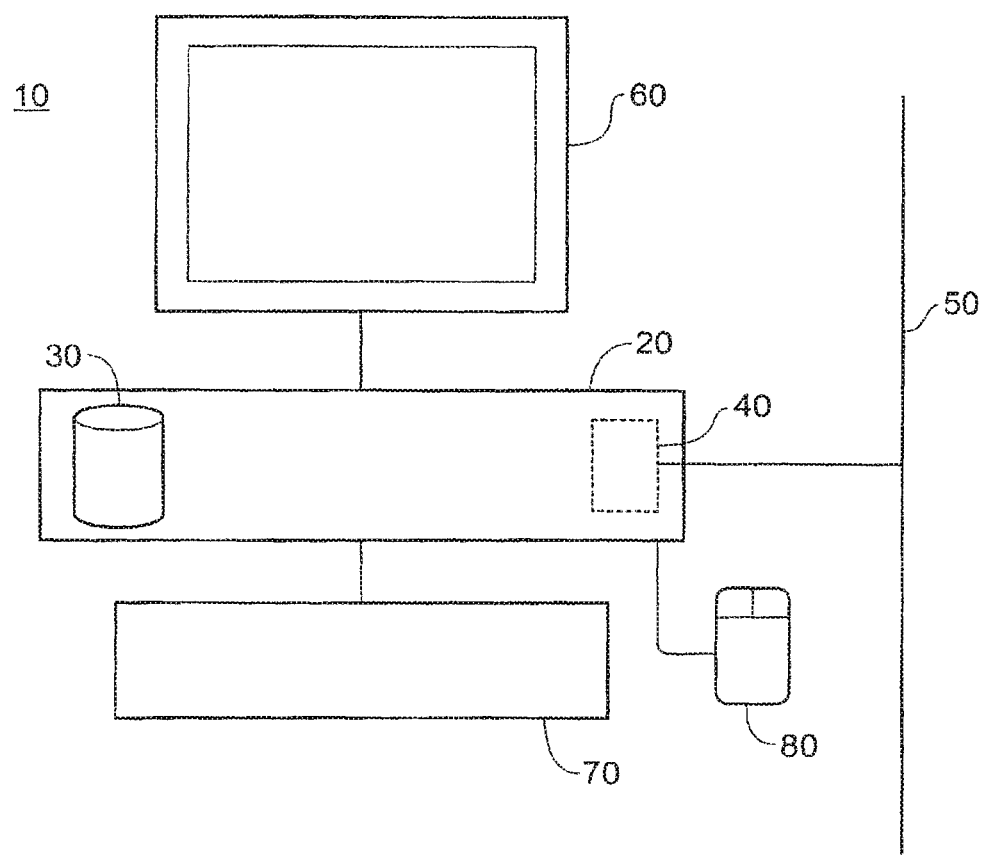
FIG. 1 schematically illustrates a video replay system.

FIG. 1 is a schematic diagram of an video replay system based around a general-purpose computer 10 having a processor unit 20 including disk storage 30 for programs and data, a network interface card 40 connected to a network 50 such as an Ethernet network or the Internet, a display device such as a cathode ray tube device 60, a keyboard 70 and a user input device such as a mouse 80. The system operates under program control, the programs being stored on the disk storage 30 and provided, for example, by the network 50, a removable disk (not shown) or a pre-installation on the disk storage 30.

Figure 2:
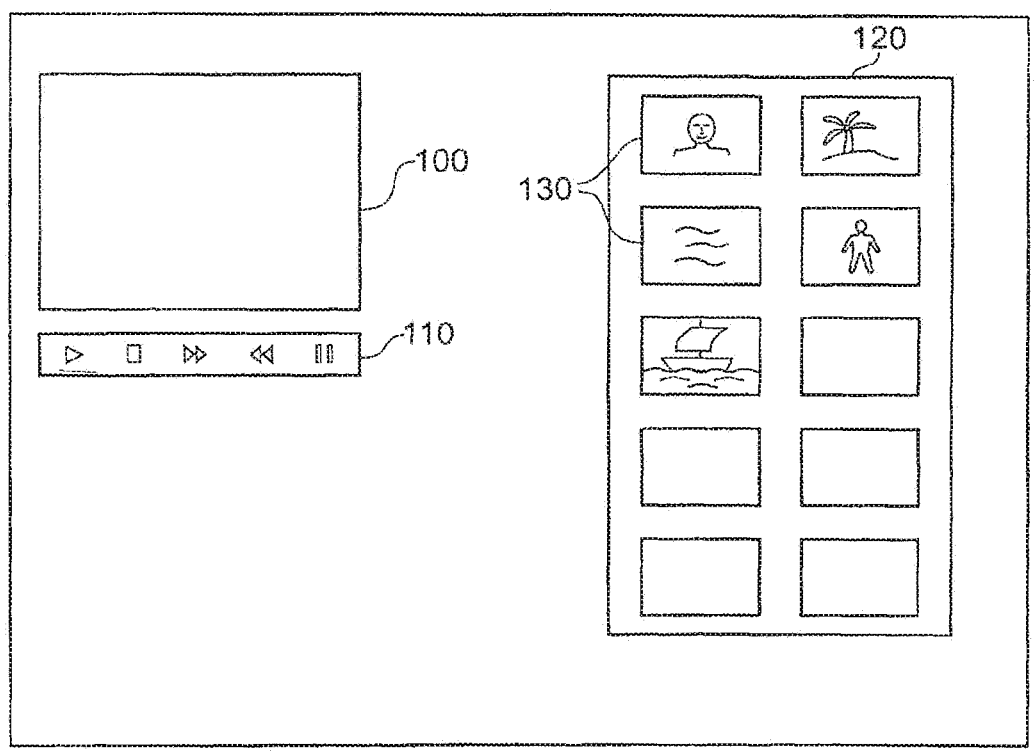
FIG. 2 schematically illustrates a display screen.

FIG. 2 schematically illustrates a display screen, for example as displayed on the display 60. For clarity, not all features of the display screen are necessarily shown, but the significant ones are; a player window 100, video player controls 110 and a catalogue area 120 containing representative key frames (images) 130.

Each representative key frame 130 corresponds to a different respective piece of video material. The key frame may be, for example, the first image of the corresponding video item or could be derived as a "most representative" image by a statistical technique such as an analysis of hue histograms. Such techniques are known and will not be documented further in the present description.

The user may select an item of the video material by placing the mouse pointer on the key frame 130 and making a single "click". This would cause the first frame of the selected video item to be displayed in the replay window 100, in a "paused" fashion. Replay can then be initiated by selecting a play control from the controls 110.

Alternatively, a "double click" on a key frame 130 causes playback of the corresponding video item to be started (from the beginning) in the view out window 100.

Each entry (key frame) in the catalogue 120 is resizable. FIGS. 3a to 3d schematically illustrate a resizable catalogue entry and the purpose behind the resizing technique.

Referring to FIG. 3A, a key frame 130 is shown. To allow this key frame to be followed throughout FIGS. 3A to 3D, the key frame is labelled as a key frame (A).

Using a mouse pointer 160, the user may "grab" (click-and-hold) the key frame 130 and resize it. This does not actually change the size or position of the initial key frame A, but opens up a window, area or box 150 (referred to as "box", though without necessarily limiting it to a rectangular shape) which, as it expands, accommodates more key frames.

So, in FIG. 3B, a further key frame 132 (labelled as "B") has been accommodated. In FIG. 3C, the box 150 has been expanded to the extent that two further key frames 134 and 136 ("C" and "D") are accommodated. In FIG. 3d, the box 150 has been changed in shape so that two further key frames 138 and 140 are accommodated. Note that these are labelled as "E" and "F", although they could in fact be the key frames "C" and "D". However, they need not be the same as "C" and "D".

In general, throughout this process, once a key frame has been displayed at a certain display position relative to the initial key frame 130, it remains displayed there as long as the box 150 is large enough still to accommodate it.

Preferably, key frames are added only as entire key frames. As is to say, as the box 150 is expanded, when it passes a threshold size which is large enough to accommodate 1 or more further key frames, those one or more further key frames are added at a single step. That is to say, partial key frames are not displayed. However, the opposite is of course possible, so that as the box expands by a small amount, a corresponding small amount of a newly revealed key frame or key frames is displayed.

The origins of the key frames "B to F" will be described with reference to FIGS. 4 and 5 below.

Referring back to FIG. 2, it can be seen that for at least some of the key frames 130, as a box 150 is expanded away from the key frame it may obscure other important parts of the display. However, in the present embodiment as soon as one of the key frames is selected to initiate replay, the box 150 disappears and so the viewer window may be seen once again.

The key frames revealed as the box 150 is expanded come from different parts of the video item. Thus, as the box expands, and increasing impression of the overall content of the video item is given to the user. Also, given that each key frame has a corresponding temporal position within the video item, it is preferred that as a key frame is selected (by a single click or a double click operation as described above), video replay is set up or initiated with effect from the temporal position corresponding to that key frame. So, the key frames provide links into different temporal positions within the video material. Again, this can be very useful to the user trying to navigate rapidly through pieces of video material.

In principle, any number of key frames may be displayed using this technique. Of course a limitation is the image size available on the display screens 60 when compared with the size of a key frame. Preferably the key frames remain the same size as the box 150 expands, as is to say, the number of key frames increases but the size of each key frame neither increases nor decreases.

FIG. 4 schematically illustrates a set of representative key frames derived from a video material item. The video item is represented by a horizontal bar 200, with time running in a horizontal direction. Vertical bars 210 schematically illustrate scene changes within the video material, as detected by a known scene change detection algorithm. The scene changes to 10 according divide the video item 200 into respective segments, and a key frame G . . . . L is derived in respect of each individual scene. (This could be, for example, the centre frame of each scene or, for example, a "most representative" frame of each scene as described above).

A ranking order is associated with the key frames G . . . . L. This order provides that one of the key frames (for example the key frame from the first scene-G-) is selected to be the single key frame 130 displayed in the catalogue 120. After that, an order is associated with the key frames so that as the box 150 is expanded, key frame are displayed in the successive order. The order can be, for example, such that the key frames are ranked in order of scene length, or scene position within the material etc). Of course, if there are insufficient scenes within the material to provide the number of key frame which can be displayed, then multiple key frame can be derived from each scene, for example by taking spaced apart frames within a scene.

Figure 5A:
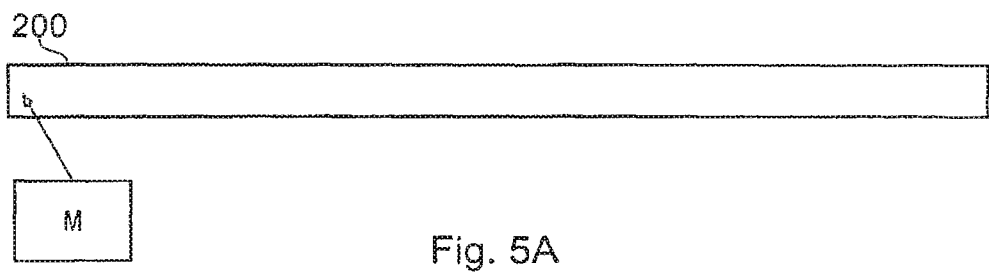
FIGS. 5A to 5E schematically illustrate another set of representative keyframes.
Figure 5B:
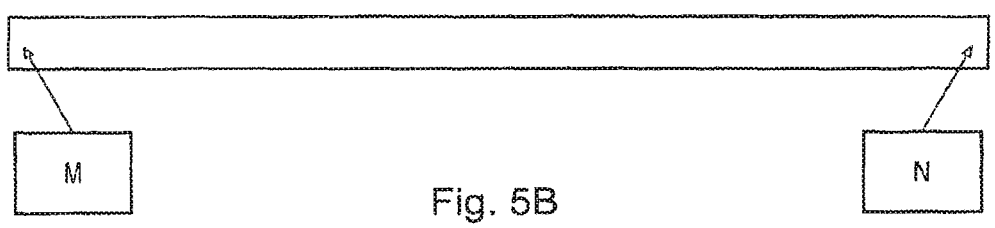
Figure 5C:
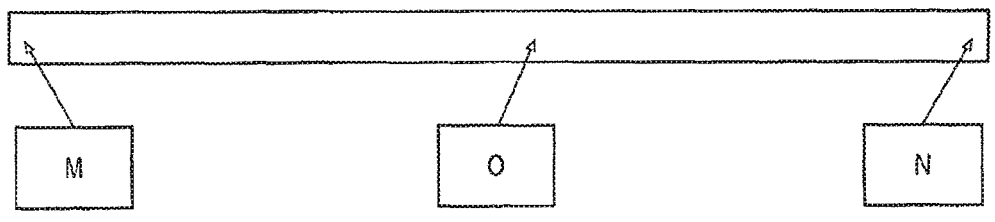

Another technique for deriving the key frames for display is shown in FIGS. 5A to 5E. Here, a first key frame, M, is taken as the first frame of the video material. In FIG. 5B, a second key frame, N is taken as the last frame of the material. When a third key frame, O is required, it is taken as the middle (or nearest to middle) key frame of the material.

Figure 5D:
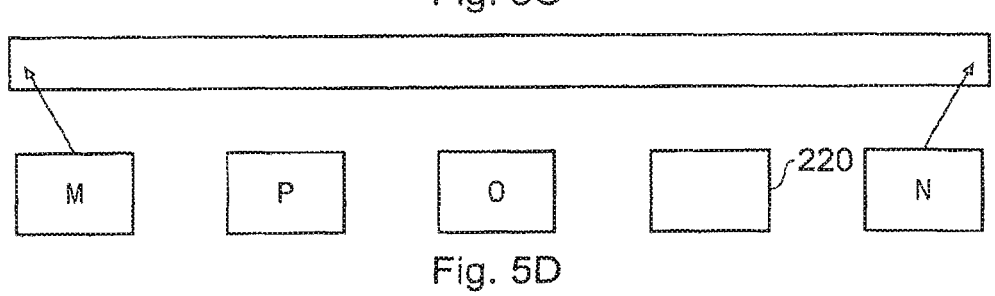
Figure 5E:
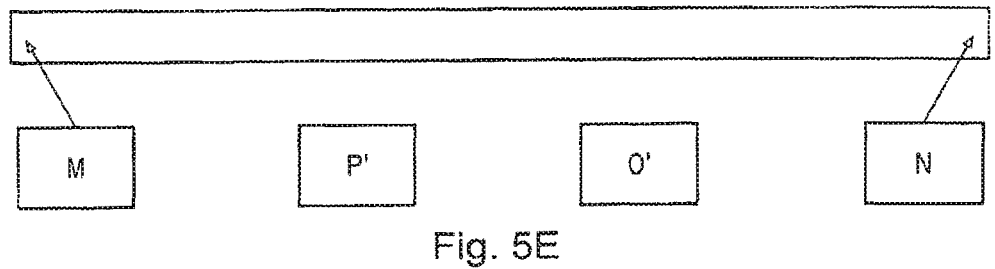

In FIGS. 5D and 5E, it can be seen that various options now present themselves. When a fourth key frame is required, one option is to subdivide the gap between two existing key frames, to provide a new key frame P. This means that a next key frame position would be the position 220 in FIG. 5D. This arrangement has the advantage that already-displayed key frames are not altered by the addition of a new key frame P. However, an alternative is shown in FIG. 5E, where at each stage, as one or more new key frames are added, the key frame are shuffled so that they are equi-spaced in time within the video material. This means that the previous key frame O from FIG. 5C stops being displayed and instead new key frames O' and P' are provided. This has the advantage that at any stage the key frames which are displayed on the screen are equi-spaced and therefore should give a particularly good representation of the content throughout the video material.

The invention may be embodied in software, programmable hardware (e.g. FPGA, ASIC), hardware or a combination of these. In the case of a software component, the invention also includes a providing (e.g. storage, transmission) medium by which such software is provided.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A display apparatus comprising:
   circuitry configured to
     retrieve a video item from a non-transitory storage medium and display a representation of the video item as a first key frame of the video item,
   playback the video item,
   generate, in response to a resize operation performed on the first key frame, a box that has borders surrounding borders of the first key frame such that a gap exists between the borders of the box and the borders of the first key frame, without changing a size of the first key frame,
   expand, in response to a user input, a dimension of the box, which has the borders surrounding the borders of the first key frame such that the gap exists between the borders of the box and the borders of the first key frame, wherein the box is generated in response to the resize operation performed on the first key frame, and
   add, in response to expanding the dimension of the box, which has the borders surrounding the borders of the first key frame such that the gap exists between the borders of the box and the borders of the first key frame and is generated in response to the resize operation performed on the first key frame, one or more second key frames of the video item within the expanded dimension of the box, the one or more second key frames being temporally different from the first key frame, wherein the one or more second key frames is of a same video item as the first key frame, at least one second key frame having a same dimension as the first key frame and a further second key frame being partially displayed within the expanded dimension of the box when the box is insufficiently expanded to display an entire further second key frame, the further second key frame remaining partially displayed within the expanded dimension of the box after the expanding of the dimension of the box has ended and when the box has been insufficiently expanded.

2. The display apparatus according to claim 1, wherein the first key frame is a first frame in time order of the video item and the second key frames are key frames from the video item equi-spaced in time.

3. The display apparatus according to claim 1, wherein the circuitry is configured to expand the box in a horizontal direction, in response to the user input.

4. The display apparatus according to claim 1, the circuitry is further configured to display multiple sets of first and second key frames within different expanded boxes.

5. The display apparatus according to claim 4, further comprising:
   a display, wherein
   the circuitry is further configured to display multiple sets of first and second key frames only on a defined area of the display.

6. The display apparatus according to claim 5, wherein playback of the video item is in a further defined area of the display of the display apparatus.

7. The display apparatus according to claim 1, wherein the circuitry is configured to expand the box in response to a drag operation of a select-and-drag operation.

8. The display apparatus according to claim 7, wherein the select-and-drag operation is controlled by a user input device.

9. The display apparatus according to claim 1, wherein playback of the video item begins from a temporal position in the video item corresponding to a selected second key frame.

10. The display apparatus according to claim 1, wherein the resize operation modifies a size of the gap before the one or more second key frames are added within the expanded dimension of the box.

11. A display method comprising:
    retrieving a video item from a non-transitory storage medium and displaying a representation of the video item as a first key frame of the video item;
    performing playback of the video item;
    generating, in response to a resize operation performed on the first key frame, a box that has borders surrounding borders of the first key frame such that a gap exists between the borders of the box and the borders of the first key frame, without changing a size of the first key frame;
    expanding, in response to a user input, a dimension of the box, which has the borders surrounding the borders of the first key frame such that the gap exists between the borders of the box and the borders of the first key frame, wherein the box is generated in response to the resize operation performed on the first key frame; and
    adding, in response to the expanding of the dimension of the box, which has the borders surrounding the borders of the first key frame such that the gap exists between the borders of the box and the borders of the first key frame and is generated in response to the resize operation performed on the first key frame, one or more second key frames of the video item within the expanded dimension of the box, the one or more second key frames being temporally different from the first key frame, wherein the one or more second key frames is of a same video item as the first key frame, at least one second key frame having a same dimension as the first key frame and a further second key frame being partially displayed within the expanded dimension of the box when the box is insufficiently expanded to display an entire further second key frame, the further second key frame remaining partially displayed within the expanded dimension of the box after the expanding of the dimension of the box has ended and when the box has been insufficiently expanded.

12. The display method according to claim 11, wherein the first key frame is a first frame in time order of the video item and the second key frames are key frames from the video item equi-spaced in time.

13. The display method according to claim 11, wherein the expanding expands the box in a horizontal direction, in response to the user input.

14. The display method according to claim 11, further comprising: displaying multiple sets of first and second key frames within different expanded boxes.

15. The display method according to claim 14, further comprising: displaying multiple sets of first and second key frames only on a defined area of the display.

16. The display method according to claim 11, wherein the expanding expands the box in response to a drag operation of a select-and-drag operation.

17. The display method according to claim 11, wherein playback of the video item begins from a temporal position in the video item corresponding to a selected second key frame.

18. The display method according to claim 17, wherein playback of the video item is in a further defined area of the display of the display apparatus.

19. A non-transitory computer-readable storage medium including computer executable instructions, wherein the instructions, when executed by a computer, cause the computer to perform a method, the method comprising:

retrieving a video item from a memory and displaying a representation of the video item as a first key frame of the video item;

performing playback of the video item;

generating, in response to a resize operation performed on the first key frame, a box that has borders surrounding borders of the first key frame such that a gap exists between the borders of the box and the borders of the first key frame, without changing a size of the first key frame;

expanding, in response to a user input, a dimension of the box, which has the borders surrounding the borders of the first key frame such that the gap exists between the borders of the box and the borders of the first key frame, wherein the box is generated in response to the resize operation performed on the first key frame; and adding, in response to the expanding of the dimension of the box, which has the borders surrounding the borders of the first key frame such that the gap exists between the borders of the box and the borders of the first key frame and is generated in response to the resize operation performed on the first key frame, one or more second key frames of the video item within the expanded dimension of the box, the one or more second key frames being temporally different from the first key frame, wherein the one or more second key frames is of a same video item as the first key frame, at least one second key frame having a same dimension as the first key frame and a further second key frame being partially displayed within the expanded dimension of the box when the box is insufficiently expanded to display an entire further second key frame, the further second key frame remaining partially displayed within the expanded dimension of the box after the expanding of the dimension of the box has ended and when the box has been insufficiently expanded.

20. The non-transitory computer-readable storage medium according to claim 19, wherein the expanding expands the box in a horizontal direction, in response to the user input.

21. The non-transitory computer-readable storage medium according to claim 19, further comprising displaying multiple sets of first and second key frames within different expanded boxes.

\* \* \* \* \*